United States Patent [19]

Schlick

[11] Patent Number: 4,825,598

[45] Date of Patent: May 2, 1989

[54] SYSTEM FOR CLEANING THE SURFACES OF OBJECTS OF GREAT SURFACE AREA FROM A MOVABLE AERIAL BUCKET

[75] Inventor: Horst D. Schlick, Metelen, Fed. Rep. of Germany

[73] Assignee: Schlick Roto-Jet Maschinenbau GmbH, Metelen, Fed. Rep. of Germany

[21] Appl. No.: 89,070

[22] Filed: Aug. 25, 1987

[30] Foreign Application Priority Data

Aug. 30, 1986 [DE] Fed. Rep. of Germany ....... 3629623

[51] Int. Cl.$^4$ ............................................... B24C 3/06
[52] U.S. Cl. ........................................ 51/410; 51/429; 51/426; 51/424
[58] Field of Search ................. 51/429, 410, 424, 425, 51/426

[56] References Cited

U.S. PATENT DOCUMENTS

| | | | |
|---|---|---|---|
| 1,628,317 | 5/1927 | Hoevel | 51/426 |
| 2,729,918 | 1/1956 | VanDenburgh | 51/429 |
| 3,548,541 | 12/1970 | Miller | 51/410 |
| 3,705,565 | 12/1972 | Hammelmann | 51/410 |
| 3,747,277 | 7/1973 | Carpenter et al. | 51/429 |
| 4,286,417 | 9/1981 | Shelton | 51/429 |
| 4,409,920 | 10/1983 | Hammelmann | 51/410 |
| 4,649,672 | 3/1987 | Thomann | 51/426 |

Primary Examiner—Frederick R. Schmidt
Assistant Examiner—Robert A. Rose
Attorney, Agent, or Firm—Felfe & Lynch

[57] ABSTRACT

The invention relates to an apparatus for sandblasting surfaces of objects of large surface area with a granular agent. The apparatus has a bucket (2) which can be moved parallel to the surface of the object, in which a sandblast aimed against the surface of the object (30) can be produced, and in which sandblasting grits rebounding from the work surface together with the removed dirt particles are caught and carried away. The apparatus is provided with a sealed cabin (1) for carrying an operator (2), which is equipped with viewing windows, and which forms with the sandblasting chamber (5) a mobile working unit (4). The bucket (3) is disposed on the outside of the cabin (1) for movement relative to the cabin surface.

7 Claims, 2 Drawing Sheets

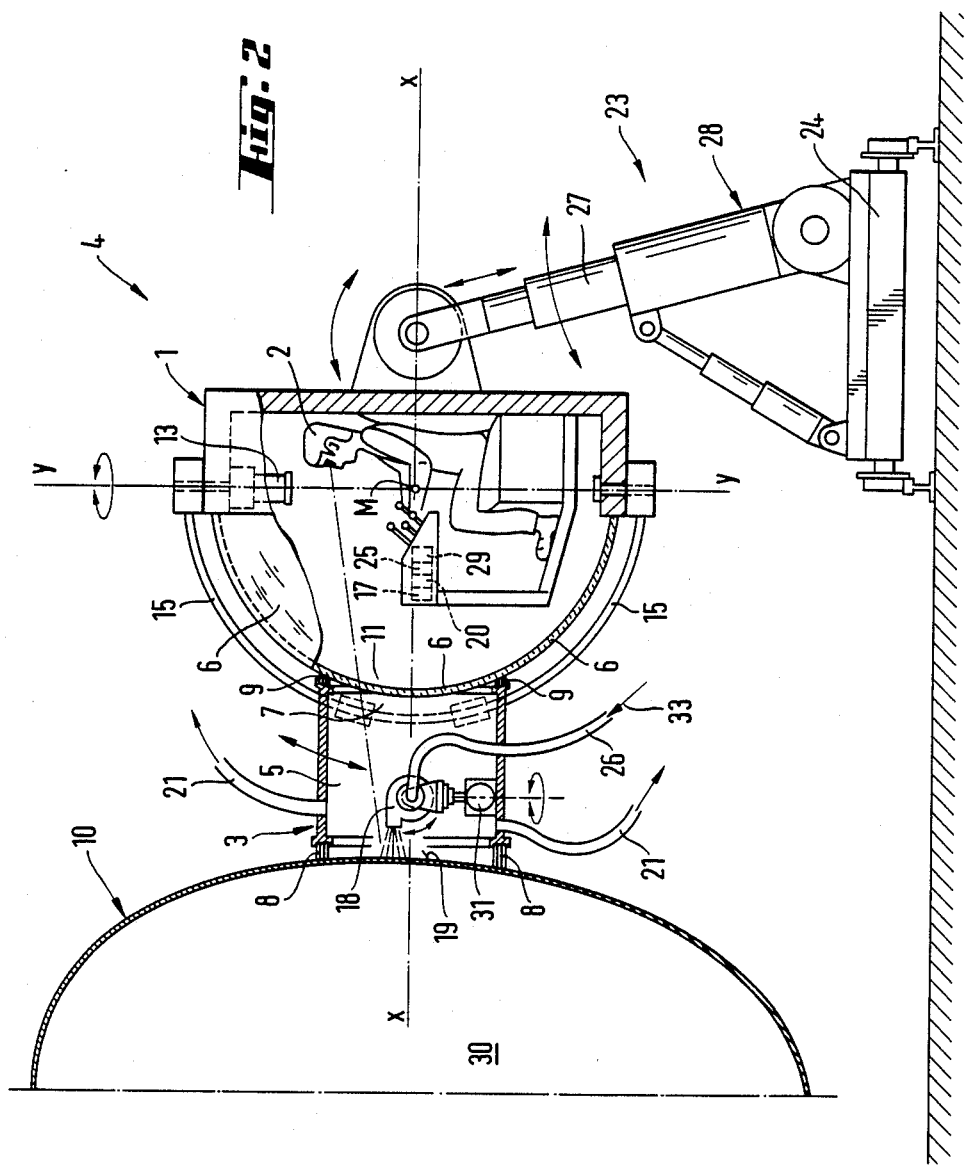

SYSTEM FOR CLEANING THE SURFACES OF OBJECTS OF GREAT SURFACE AREA FROM A MOVABLE AERIAL BUCKET

BACKGROUND OF THE INVENTION

The invention relates to a system for cleaning the surfaces of objects of great surface area with a granular sandblasting agent, having a mobile aerial bucket which can be moved parallel to the surface of the object, in accordance with the generic part of claim 1.

Such a system is disclosed in DE-PS 29 04 093. The known system serves for cleaning and sandblasting, especially of objects of great surface area, such as ships' hulls in a drydock and the like, and it is equipped with an aerial bucket which is movable relative to the work surface of the object. The bucket, for example, is one that is carried on the end of a telescoping boom and has fixedly installed sandblasting nozzles, and it is moved along the ship's hull. At the same time a system is preferably provided for cleaning the sandblasting agent in the bucket itself. It is also known, however, to carry used sandblasting agent and the debris removed thereby away from the bucket into a system for processing them. The sandblasting bucket is guided by means of a digital control unit set up on the side.

Also known are sandblasting systems in which an operator runs a sandblasting apparatus from a shielded pulpit (EP-OS 123 847). However, this sandblasting is performed within a closed work chamber with the corresponding recovery systems. Here the operator is protected, yet dust and dirt particles fly about within the closed work chamber, so that poor visibility prevails therein. Also, the movement of the sandblast guidance system relative to the object is comparatively limited. On account of the requirement that the work be performed inside of the enclosed work area, only those workpieces or objects can be sandblasted therein which can fit within the dimensions of the small amount of space available within the work area. For objects of large surface area, such as ships or aircraft, the known apparatus is unsuitable precisely for this reason and would be in any case uneconomical and too complicated.

The invention is addressed to the problem of devising an apparatus for the cleaning and sandblasting of objects of especially great surface area, such as large space aircraft not contained in an enclosed work area, with a work bucket that can be moved relative to the work surface of the object. Such an apparatus must permit individual observation and guidance by an operator without hampering the movement of the sandblasting head. At the same time, allowance is to be made for the fact that the sandblasting of the outer surfaces of aircraft, especially large space aircraft, is based on a comparatively new technical development. The outcome of this development is that special sandblasting agents made from comparatively hard plastic particles are available, which are capable of economically removing aged and pitted protective coatings from the aircraft's external surfaces which are usually made of aluminum, without attacking the underlying metal. On account of the varied contours of the surface it is advantageous for the progress of the work to be observed and carefully controlled by an operator.

The art of sandblasting aircraft surfaces with plastic grits is basically known. It advantageously eliminates the removal of paint with toxic acids. Employing it in an open hangar, however, is very complicated on account of the flying dust it creates and the difficulty of recovering the grits that have settled on the ground by means of large, special vacuum cleaners, and therefore it is in need of improvement.

Consequently the invention is addressed to the special problem of developing a sandblasting apparatus which will be especially suited for cleaning large areas of aircraft with special nonabrasive grits, and, while avoiding the raising of dust and the escape of particles into the hangar, will permit direct observation of the sandblasted surface by an operator without hampering the freedom of movement and hence the performance of the apparatus.

SUMMARY OF THE INVENTION

The stated problem is solved according to the invention, in an apparatus for the sandblasting especially of objects of great surface area, with a work bucket forming an enclosed chamber, of the kind described in the beginning, by the fact that the apparatus is combined with a sealed cabin equipped with a window or windows and containing an operator, such that the apparatus is in the operator's range of view and forms with the cabin a mobile working unit.

Thus, the cleaning and sandblasting advantageously take place inside of the apparatus, in a sealed off work chamber between the work surface of the object and the sandblasting nozzle; at the same time the sandblasting operation can be observed and controlled by the operator from the cabin. In particular, surfaces can be covered even repeatedly until the paint is completely removed.

An especially advantageous embodiment is one in which the work chamber is sealingly in contact with the cabin in the area of the inspection window and is open at its back facing the cabin, so that the operator can look through the work chamber at the area of the surface that is being cleaned. The operator can thus see the surface and control the sandblasting process accordingly. It is to be noted that grits must be kept away from many points on an aircraft, e.g., the control flaps, landing flaps and braking flaps etc., and therefore careful control by hand is indispensable, although on the other hand there are large areas which can be sandblasted expeditiously and with great effectiveness.

In an important embodiment, the cabin is made with a preferably curved observation window, in the form of a spherical body for example, at least in the area of its front side facing the object, and has means for swiveling the sandblasting head about the center of the curvature. Within the cabin, appropriate controls are provided for the swiveling mechanism. This embodiment makes it possible, to great advantage, to sandblast the curved surfaces of the hull from above, at an angle from the side, from the side, at an angle from below or from below, while the cabin and the operator remain in approximately the same position, while the bucket assumes an angular position in which it is approximately perpendicular to the surface being sandblasted.

For this purpose an embodiment is provided, according to which the sandblasting bucket can swivel about a horizontal axis as well as a vertical axis; in addition, it should be also able to turn in place.

Furthermore, in an advantageous embodiment the bucket is provided with an impeller wheel with a system for changing its aim with respect to the work surface about preferably two axes which are preferably perpendicular to one another and approximately parallel to the work surface.

Additional advantageous embodiments of the invention are provided in the features of additional subordinate claims.

BRIEF DESCRIPTION OF THE DRAWING

The invention is shown in the drawing in a preferred embodiment, and additional advantageous details of the invention can be seen in the drawing. The figures show the following:

FIG. 2 a side view of an industrial embodiment of the apparatus.

Figure 1:
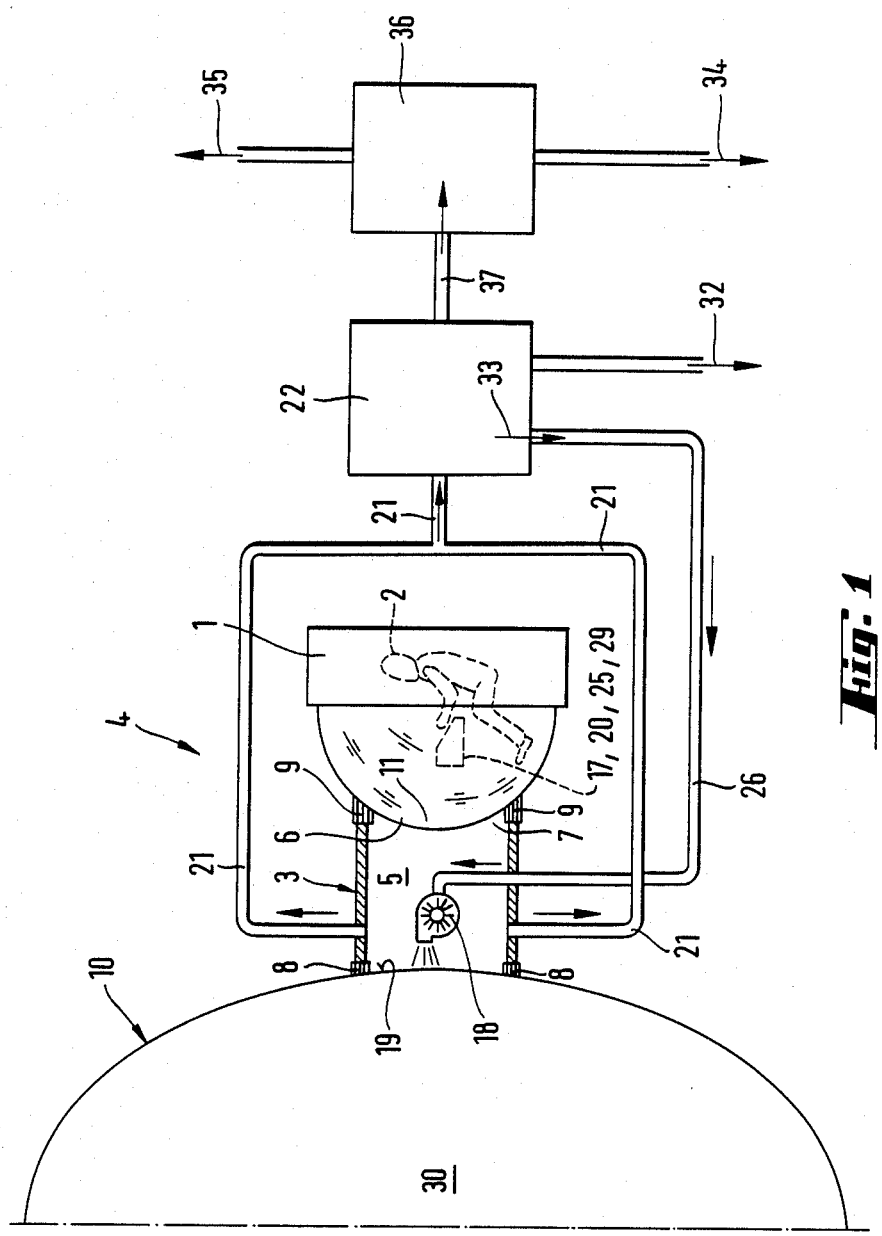
FIG. 1 a diagrammatic representation of an apparatus and its operation.

The apparatus for cleaning and sandblasting represented in FIG. 1 is suitable especially for the removal of old paint from the aluminum skin of large space vehicles, i.e., from an object 10 not contained in an enclosed work area, with a sandblasting bucket 3 which can be moved relative to the work surface 19 of the object 10, and which by means of sealing elements, forms with a portion of the surface 19 of the object, an enclosed sandblasting chamber 5. The sandblasting bucket 3 is connected to an impeller wheel 18 as the means for the production of the blast and to a conduit 21 for removing used grits and residues and a grit feeding conduit 26.

FIGS. 1 and 2 show a sealed cabin 1 in which an operator 2 is seated. The bucket 3 with the cabin 1 forms a working unit 4. This is accomplished by combining the bucket 3 functionally with the cabin 1. An observation window 6 separates the cabin from the sandblasting chamber 5. The bucket 3 is open on the back 7 facing the cabin and the operator 2 therein, and is sealed off from the observation window 6 by sealing means 9. At it appears from this, the open-backed bucket 3 is in the form of a tubular body which permits the operator to look through the sandblasting chamber at the work surface 19 and observe the latter and control the sandblasting process accordingly.

At the same time provision is made for the cabin 1 to have, at least in the area of its front side 11 facing the object 10, a spherically curved observation window 6. The sandblasting bucket 3 can be rotated by means of a drive 13 about the center of curvature M of the spherical observation window 6.

Basically, however, it is also possible to mount the cabin rigidly.

Within the cabin 1, however, controls 17 are preferably present for the operation of the drive 13. The drive is constructed, for example, with a semicircular guide 15. Also, the drive can be so constructed that the bucket 3 can perform, on the guide 15, upward and downward movements at an angle about the center M of the spherical observation window 6. Thus, with equally good visibility, the operator 2 can work on the hull of the aircraft (object 10) from a position at an angle from below or at an angle from above, along a radius of curvature, with a full view of the work surface. Also, the bucket 3 can be turned about its own axis.

By the advantageous configuration of the cabin 1 with guide and drive 15 and 13 for turning the bucket 3 about the center of curvature M, the operator is thus able to perform a rotation about a horizontal axis x-x and about a vertical axis y-y. These movements are controlled by means of controls 17 present in the cabin 1.

The apparatus represented in FIG. 2 offers the possibility of swiveling the impeller wheel 18 within the bucket 3, and a system 31 is provided which changes the direction of its action on the surface 19 of the object 10. The system 31 can have means for turning the impeller wheel 18 about preferably two axes perpendicular to one another and approximately parallel to the object surface 19. For this purpose control means 20 are provided in the cabin 1 which enable the operator to exercise a rapid and effective control of the aim of the blast by means of appropriate operating levels. FIGS. 1 and 2 also show systems for processing the used grits. To permit dust-free operation without the loss of grits, sealing means 8 and 9 are provided on the bucket 3 both with respect to the observation window 6 of the cabin 1 and with respect to the object surface 19, and they are in the form of flexible lips or brush arrays 8 and 9 running all the way around the window. The sandblasting chamber 5 is connected by a flexible hose 21 to a vacuum chamber 22. As it can be seen in FIG. 1, the vacuum chamber 22 is in turn equipped with a system, known in itself, for the separation of air, recoverable grits, and residues. The residues are carried out of the apparatus in accordance with the arrow 32, while recovered grits 33 are returned to the impeller wheel 18.

Dust-charged exhaust air is fed through conduit 37 to a filter system 36 in which the dust is separated from the cleaned air 35 and carried out of the apparatus as indicated by the arrows.

The cabin 1 is furthermore mounted on a positioning means 23 on a chassis 24 running on tracks, for example. This positioning means 23 has means for performing relative movements between cabin 1 and object 10, such relative movements being able to be performed at least in one vertical and one horizontal plane. The cabin 1 is thus able to travel with the chassis 24 along the object 10 while varying in position and in height and depth. For this purpose, controls 25 are likewise provided in the cabin for controlling these positioning movements.

As a variant, the cabin 1 can also be disposed on the arm 27 of an industrial robot 28 and can be carried thereby along a large object 10, such as an aircraft 30 for example, according to a given working and shifting program. In this case it is the operator's task to control the rate of movement by observing the results of the cleaning of the surface 19. He can accordingly accelerate, slow down, or repeat the movements which are programmed. In addition, means can be provided whereby the intensity of the stream from the impeller wheel 18 can be controlled. This can be done preferably by varying its rotatory speed through a control 29.

The subject matter of the application is especially adapted to the sandblasting of large areas on aircraft fuselages and wings, wherein on the one hand a maximum of mechanization is desired, and on the other hand careful visual control by an operator. The subject matter of the invention is very practical for this purpose.

I claim:

1. Apparatus for cleaning surfaces of objects of large surface area with a granular sandblasting agent, comprising: a sandblasting bucket, means for moving the bucket parallel to the object surface, means for producing through one open side a jet aimed against the surface of the object, means for catching and carrying away granular sandblasting agent rebounding from the material surface together with removed dirt particles, a sealed cabin equipped with at least one observation window for containing an operator, the apparatus being attached to said sealed cabin such that the apparatus is disposed in the range of view of the operator and forms with the cabin a single mobile working unit and that the sandblasting bucket is movable on the outside of the cabin relative to the cabin surface and that movements of the sandblasting bucket are controlled by the operator.

2. Apparatus according to claim 1, characterized in that the sandblasting bucket sealingly contacts the cabin in the area of the view window of the cabin and is open at its back facing the cabin, so that the operator can look through the bucket at the portion of the surface that is to be cleaned.

3. Apparatus according to claim 2, characterized in that the cabin is constructed, at least in the area of its front side facing the object, with a curved observation window, and that means are provided for swiveling the bucket about the center of curvature of the observation window.

4. Apparatus according to claim 1, characterized in that the bucket is displaceable and additionally rotatable both along a horizontal axis (x-x) and also about a vertical axis (y-y).

5. Apparatus according to claim 1, characterized in that the bucket has an impeller wheel with a system for swiveling its sandblasting direction with respect to the object surface about preferably two axes perpendicular to one another and approximately parallel to the object surface.

6. Apparatus according to claim 1, characterized in that the cabin is disposed on a chassis through a guidance system with means for performing movements relative to the object in at least one vertical and one horizontal plane and can travel with the chassis position-variably on the object.

7. Apparatus according to claim 6, characterized in that the cabin is disposed on the arm of an industrial robot and is held by the latter for movement along an object, an aircraft for example, according to a given work and movement program.

* * * * *